US006419095B2

(12) United States Patent
Green et al.

(10) Patent No.: US 6,419,095 B2
(45) Date of Patent: Jul. 16, 2002

(54) FILTER ASSEMBLY FOR USE IN A PRESS MOULD

(75) Inventors: Barrie Edward Green, Derby; Terence Butlin, Radford, both of (GB)

(73) Assignee: Eco Filters Limited, Nottingham (GB)

( * ) Notice: Subject to any disclaimer, the term of this patent is extended or adjusted under 35 U.S.C. 154(b) by 0 days.

(21) Appl. No.: 09/772,107

(22) Filed: Jan. 26, 2001

(30) Foreign Application Priority Data

Jan. 27, 2000 (GB) ........................................ 0001760

(51) Int. Cl.[7] ........................ B01D 29/05; B01D 39/08

(52) U.S. Cl. ...................... 210/489; 210/498; 210/499; 100/122; 442/314

(58) Field of Search ............................ 210/489, 498, 210/499; 100/122; 55/DIG. 43; 162/900, 902, 903; 442/312–314

(56) References Cited

U.S. PATENT DOCUMENTS 3,713,942 A * 1/1973 Kim ........................ 156/177
5,466,339 A * 11/1995 Legge .................. 139/383 A
5,562,665 A * 10/1996 Young ...................... 606/62

* cited by examiner

*Primary Examiner*—Matthew O. Savage
(74) *Attorney, Agent, or Firm*—Donn K. Harms

(57) ABSTRACT

A filter assembly for use in a press mould for moulding of cementitious products, the filter assembly including a fabric mounted in face to face contact with a support plate, perforated with a plurality of apertures arranged in a predetermined pattern to permit passage of fluid through the plate, the apertures defining imperforate zones there between, the fabric being knitted or woven to have a surface defined by a plurality of parallel ribs in face to face contact with the support plate, each pair of adjacent ribs defining therebetween opposed sides of a fluid channel which communicates with a number of said apertures and said imperforate zones, the ribs being knitted or woven to be sufficiently non-compressible in order to resist collapse of said fluid channels during compression of the cementitious product within said mould.

4 Claims, 4 Drawing Sheets

FILTER ASSEMBLY FOR USE IN A PRESS MOULD

The present invention relates to a fabric, and a filter assembly for use in a press mould for moulding of particulate materials, in particular cementitious products.

A fabric of the type with which the present invention is concerned is described in our UK patent 2277536B.

A general aim of the present invention is to provide a fabric and a filter assembly for a press mould which maintains good drainage characteristics after repeated usage.

Various aspects of the present invention are hereinafter described, with reference to the accompanying drawings, in which.

FIGS. 7*a*–7*d* show lapping motions of a suitable warp knit fabric.

Figure 1:
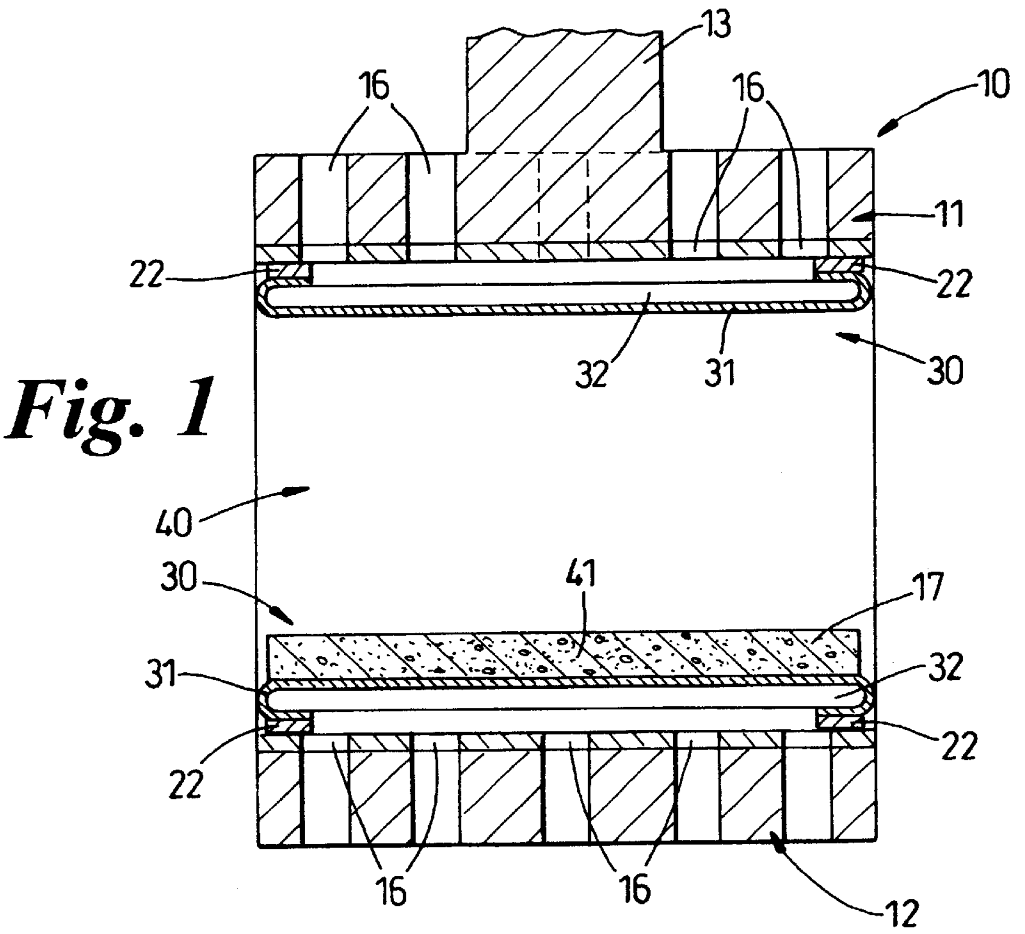
FIG. 1 is a sectional side view (taken along line II—II in FIG. 2) of a press mould including a filter assembly according to an embodiment of the present invention.
Figure 2:
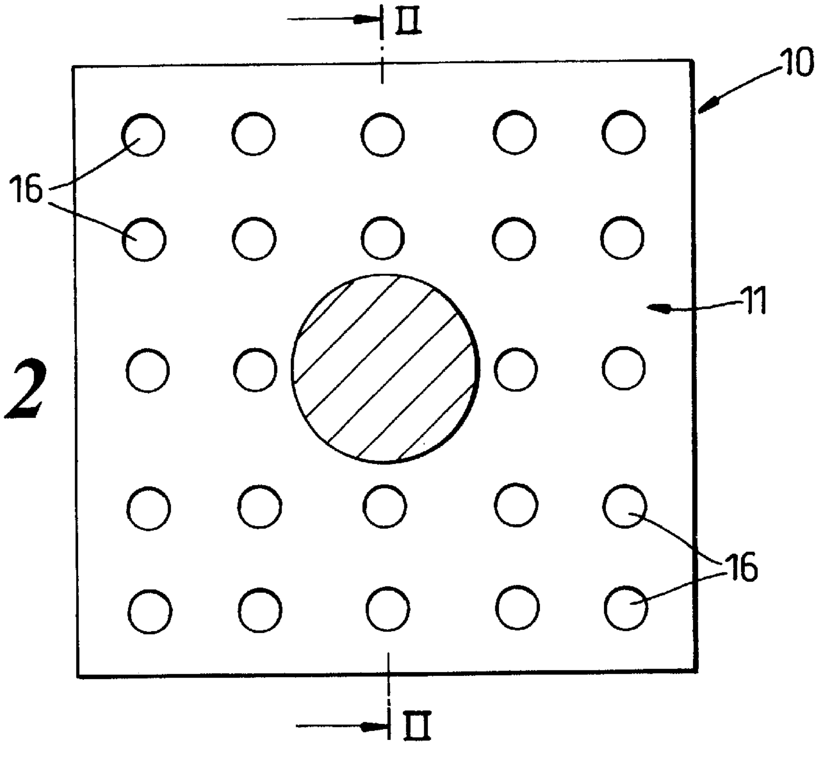
FIG. 2 is a plan view, partly in section, of the press mould of FIG. 1.
Figure 3:
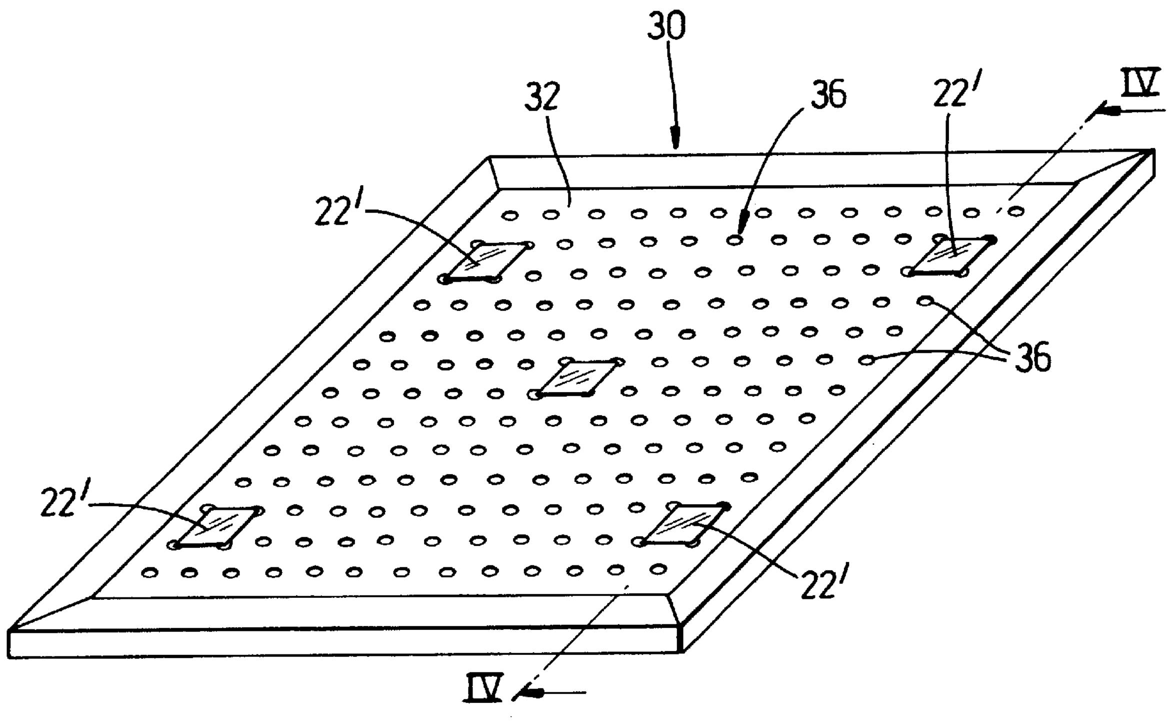
FIG. 3 is a schematic perspective view of the filter assembly shown in FIG. 1.
Figure 4:
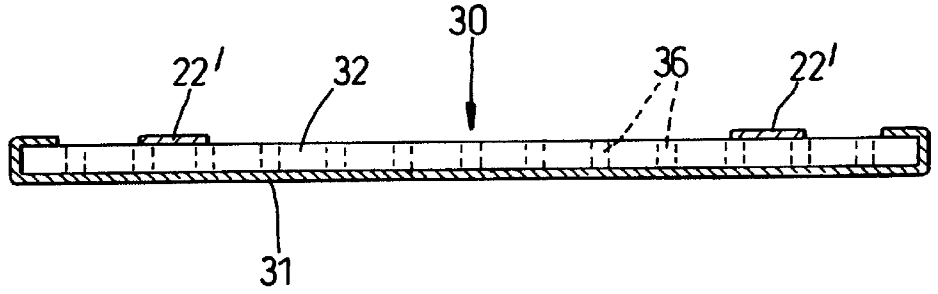
FIG. 4 is a sectional view of the filter assembly of FIG. 3 taken along line IV—IV.

Referring initially to FIGS. 1 and 2 there is shown a press mould 10 for creating concrete slabs 17. The mould 10 includes a top and bottom platten 11, 12, each having a plurality of drainage conduits 16. The top platten 11 is connected to the shaft 13 of a ram so as to be movable toward the bottom platten 12 for compressing cementitious material therebetween for forming the concrete slab 17.

Typically the compressive pressure generated between the top and bottom plattens 11,12 is about 2000 p.s.i.

The mould faces of the top and bottom plattens 11, 12 are each covered by a filter assembly 30 according to the invention.

Each filter assembly 30 is removably fixed to its respective platten 11, 12 and acts to permit water to pass therethrough and into the drainage conduits 16 during the moulding process whilst acting to prevent passage of particulate material therethrough.

Preferably the filter assembly 30 includes a perforated support plate 32 covered by a layer of filter fabric 31.

The perforated support plate 32 is preferably formed from a plastics material and includes a plurality of perforations or apertures 36 which are preferably arranged in an array of columns 37 and rows 38. The perforations 36 act to provide flow paths for water which is extracted from the slab 17 during the pressing operation.

The apertures 36 are preferably arranged to comply with the notation 2.5; 23; 45°; where 2.5 represents the diameter of each aperture in mm; 23 represents the percentage open space/sq.in and 45° represents the angle $\theta^1$ (see FIG. 6) between a row of apertures and an aperture in the next adjacent row and column.

Other notations may be adopted if desired, for example 2.5; 23; 60°.

It will be appreciated that the imperforate zone IP located between the apertures 36 and these imperforate zones potentially define a barrier for preventing fluid communication between the slab 17 and apertures 36.

This can cause detrimental effects on the slab 17, particularly at the time of release when the top platten 11 moves away. At this time if there is a poor fluid communication between the imperforate zone IP and surrounding apertures 36, it is possible for a vacuum to be generated which causes a part of the slab 17 to break away and remain on the filter.

Figure 5:
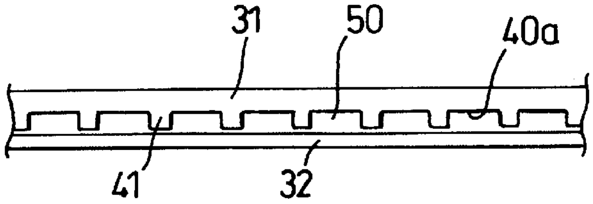
FIG. 5 is an enlarged diagrammatic side view of a portion of a filter fabric forming part of the filter assembly.
Figure 6:
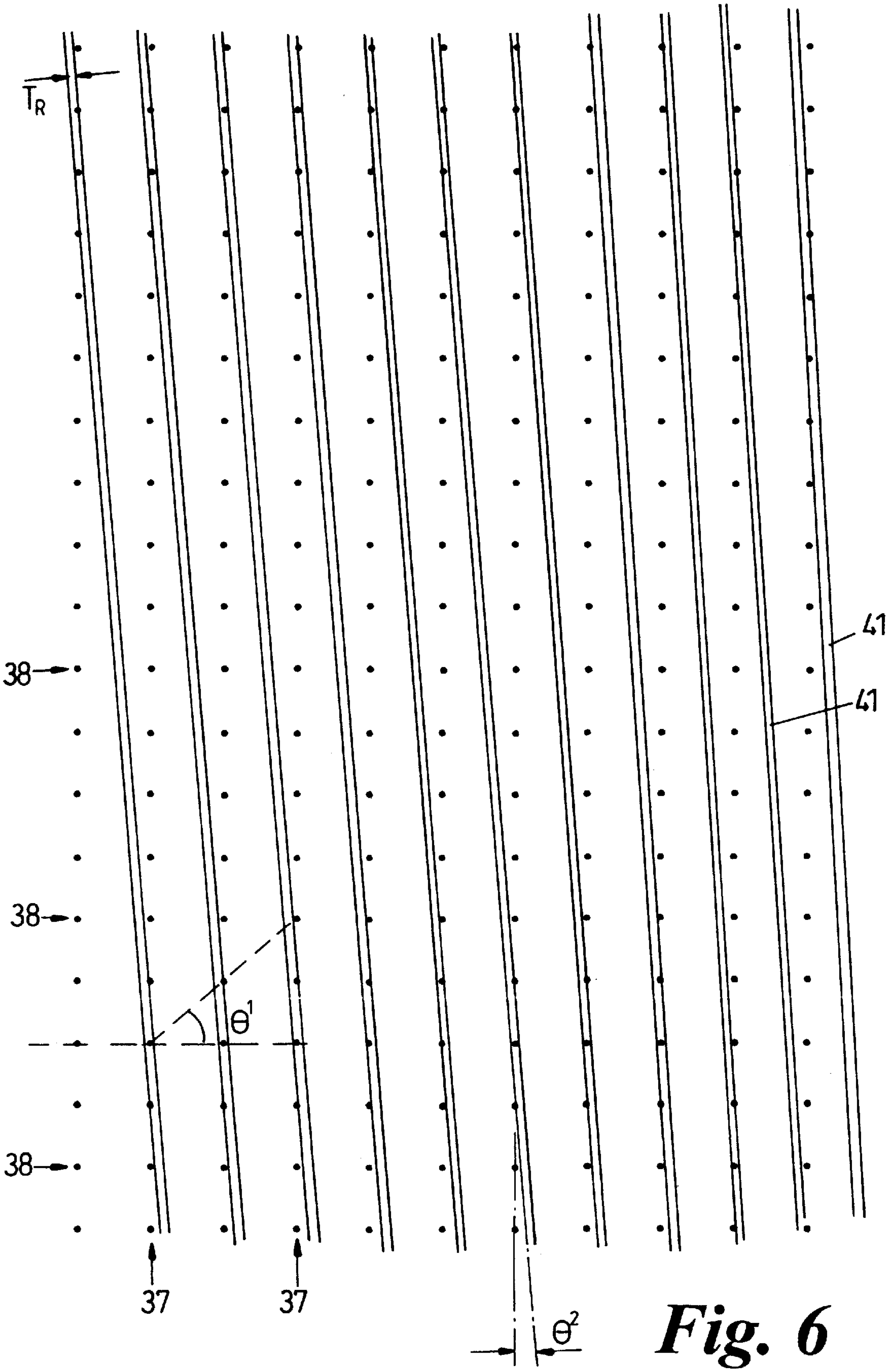
FIG. 6 is a diagrammatic plan view showing the interrelationship between the fabric and support plate of the filter assembly.

The fabric 31 is preferably a warp knitted fabric which, as indicated in FIGS. 5 and 6, has a ribbed surface 40 which, in use, is arranged in face to face contact with the support plate 32.

The ribbed surface 40 is defined by a plurality parallel ribs 41 which are spaced apart by a distance DF (see FIG. 6) which is dependent upon the gauge of machine on which the fabric is knitted and the size of the yarns making up the fabric.

Typically it is envisaged that the fabrics for both the top and bottom plattens 11,12 will be knitted on machines having a gauge between 9 to 24 gauge.

Typically more water is extracted through the top platten 11 during the pressing process. Accordingly, the spacing between the ribs 41 on fabric for covering the top platten will usually be greater than the spacing between ribs 41 of the fabric covering the bottom platten 12.

Typically the fabric for the top platten is knitted on a 12-gauge machine, whereas the fabric for the bottom platten is knitted on an 18-gauge machine.

Since the ribbed surface 40 is located in face to face contact with the support plate 32, pairs of adjacent ribs 41 define therebetween opposed sides of fluid conducting channels 50, the top and bottom of the channels 50 being defined by the rear face 40*a* of the fabric bridging the ribs 41 and the opposed surface of the plate 32.

The channels 50 are arranged to extend across the imperforate zones IP and so provide fluid communication with the surrounding apertures 36.

Preferably, as seen in FIG. 6, the ribs 41 are arranged to extend in the same general direction as the columns 37, being slightly inclined thereto by an angle $\theta^2$. Preferably angle $\theta^2$ is typically about half the angle chosen in the notation for the distribution of the apertures. Thus where is$\theta^1$ is 45°, $\theta^2$ is about 22½°.

Accordingly, ribs 41 extend longitudinally to cross the columns 37 of apertures 32. This ensures that a minimum number of apertures 32 in any one column 37 can be potentially blocked by a given rib 41. With this arrangement, striping effects on the concrete block caused by a column 37 of blocked apertures 32 is avoided.

In use, the filter fabric assembly 30 is repeatedly compressed during the pressing operation for forming the concrete slab 17.

In order to enable the filter assembly 30 to be repeatedly used for a desirable number of repeated operations it is necessary for adjacent ribs 41 to be resistive to the compressive force applied by the top and bottom plattens 11, 12 in order to avoid collapse of the fluid conducting channels 50. Once the channels 50 have collapsed, fluid cannot readily drain away through apertures 32 and so when this happens, the filter assembly requires replacement.

As indicated above the fabric 31 is preferably a warp knit fabric and the ribs 41 are preferably formed by wales of knitted stitches.

Figure 7B:
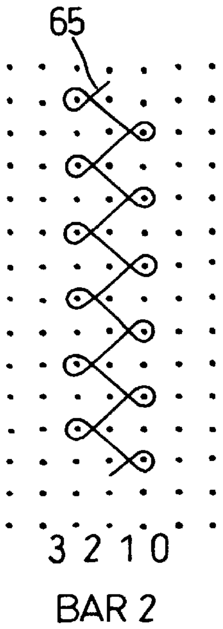
Figure 7A:
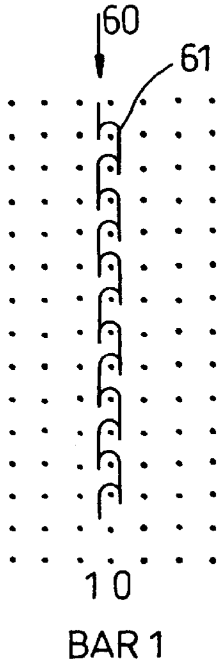

The lapping motion for a suitable ground fabric is illustrated in FIGS. 7*a*, 7*b*.

In FIG. 7*a*, bar 1 is shown to undergo a 1-0/0-1 repeat motion in order to produce a wale 60 defined by the same warp yarn 61. Preferably bar 1 is fully threaded (full set) although it is envisaged that bar 1 may be partially threaded (eg. one in—one out: ie. half set) in order to provide a greater DF dimension.

In order to render the wales 60 resistive to compressive deformation, and thereby resist collapse of the channels 50, a relatively inextensible yarn 61 is chosen and the stitches making up respective wales 60 are knitted sufficiently tightly.

In addition, a filling yarn 70 is preferably laid-in along each wale 60 in order to provide additional bulk and resistance to compressive deformation.

Preferably the filling yarn 70 is laid-in along each wale 60 by an additional bar undergoing as 0-0/1-1 repeat lapping motion.

If a filling yarn 70 is used, preferably yarn 70 is guided by the rearmost bar, bar 1. In which case, the remaining sets of yarns are threaded into the next forward bar, i.e. yarn 61 is guided by bar 2 instead of bar 1, etc.

In order to create a tight knit ground fabric, a weft yarn 65 is knitted in which acts to link wales 60 using a fully threaded bar 2 undergoing a 1-0/2-3 repeat lapping motion.

Figure 7C:
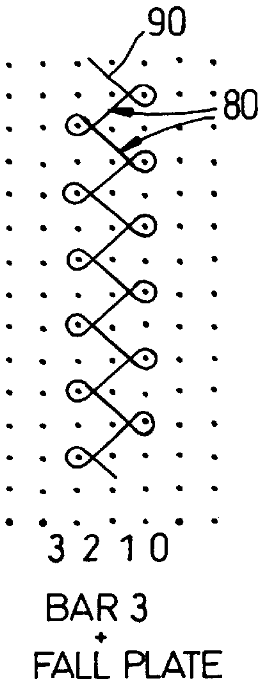
Figure 7D:
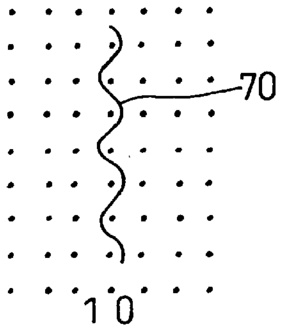

Preferably, as disclosed in our UK patent 2277536 (and as shown in FIG. 7*c*), the fabric 31 is provided with a surface for contacting the concrete slab 17 which is defined by a series of closely spaced floats 80. In this respect yarn 90 is preferably knitted in using a fully threaded bar 3 undergoing a 2-3/1-0 repeat lapping motion and using a fall plate.

Typically the yarn count for yarn 60 is about 150 dtex and for yarn 65 is about 300 dtex. Collectively, the combined yarn count for both bars 1 and 2 is preferably in the range 350 to 650 dtex.

Typically yarn 70 is of a yarn count of about 150 dtex.

Yarns 60, 65 and 70 are preferably non-textured yarns; preferably polypropylene.

Preferably yarn 90 is a monofilament yarn having a size of about 0.17. Yarn 90 is preferably polypropylene.

Preferably the fabric is heat set after knitting and is also subjected to a finishing process in order to remove lubricants, conditioners etc from the yarns.

As an alternative arrangement, it is envisaged that the filter assembly of the present invention may comprise separate superimposed layers of fabric in which a lower fabric layer in surface contact which the support plate 32 has said ribbed surface 40 and in which an upper fabric layer in surface contact with the concrete slab 17 is provided with a surface defined by a series of closely spaced floats.

It is envisaged that the wales 60 may be formed by more than one warp yarn 61. For example, bar 1 may undergo a lapping motion of 0-1, 1-0 (repeat for x courses)

1-2, 2-1 (repeat for y courses); then repeat sequence.

Both x and y are preferably greater than 3; x and y may be different or the same.

As indicated above, the apertures 36 are usually circular in shape.

However, due to the fact that the fabric of the present invention is relatively flexible, during the pressing process, the shape of the apertures can be imprinted onto the slab.

This phenomena can be used with advantage to provide desired surface patterns on the slab. Accordingly, the apertures 36 may be of a geometrical shape in order to provide different surface effects on the slab.

What is claimed is:

1. A filter assembly for use in a press mould for moulding of cementitious products, the filter assembly including a fabric mounted in face to face contact with a support plate, perforated with a plurality of apertures arranged in a predetermined pattern to permit passage of fluid through the plate, the apertures defining imperforate zones therebetween, the fabric being knitted or woven to have a surface defined by a plurality of parallel ribs in face to face contact with the support plate, each pair of adjacent ribs defining therebetween opposed sides of a fluid channel which communicates with a number of said apertures and said imperforate zones, the ribs being knitted or woven to be sufficiently non-compressible in order to resist collapse of said fluid channels during compression of the cementitious product within said mould.

2. A filter assembly according to claim 1 wherein the fabric is a warp knitted fabric and the ribs are formed by wales of knitted stitches, the ribs being rendered sufficiently non-compressible by knitting the stitches sufficiently tightly.

3. A filter assembly according to claim 1 wherein the fabric is a warp knitted fabric and the ribs are formed by wales of knitted stitches incorporating at least one filler yarn which is laid-in or knitted-in along each wale of knitted stitches, the ribs being rendered sufficiently non-compressible by the incorporated filler yarns.

4. A filter assembly according to claim 1, 2 or 3 wherein the apertures in said plate are arranged in an array of columns and rows, said ribs being arranged so as to extend longitudinally at an acute angle relative to said columns.

* * * * *